United States Patent [19]

Ansong

[11] Patent Number: 5,514,770

[45] Date of Patent: May 7, 1996

[54] SULFIDES OF NITROAMINO TRIPHENYL AND SUBSTITUTION OR AMINO FUNCTIONALIZED PRODUCTS THEREOF AND THE METHOD OF PREPARING THE SAME

[76] Inventor: Omari Ansong, P.O. Box 73895, Washington, D.C. 20056-3895

[21] Appl. No.: 424,668

[22] Filed: Apr. 18, 1995

[51] Int. Cl.$^6$ ................................................. C08G 75/00
[52] U.S. Cl. .................. 528/373; 528/49; 528/60; 528/85; 528/321
[58] Field of Search .................. 528/85, 49, 60, 528/70, 71, 73, 321, 373

[56] References Cited

U.S. PATENT DOCUMENTS

| | | |
|---|---|---|
| 1,965,776 | 7/1934 | Lantz . |
| 2,044,045 | 6/1936 | Baldwin et al. . |
| 5,075,409 | 12/1991 | Barthelemy et al. ............... 528/85 |

OTHER PUBLICATIONS

Grob, C. A. and P. Brenneisen, "Die Synthese von 4-Brom-und 4-Hydroxy-chinuclidin", Helv. Chim. Acta (1958) p. 1184.

*Primary Examiner*—Shelley A. Dodson
*Attorney, Agent, or Firm*—Schmeiser, Olsen & Watts

[57] ABSTRACT

A composition of matter having nonlinear optical activity and the method of preparing the same of the following general formula:

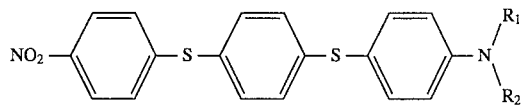

wherein the benzene nuclei may be substituted and wherein $R_1$ and $R_2$ are selected from the group consisting of:

a hydrogen atom;
an aliphatic radical;
a cycloaliphatic radical;
an arylaliphatic radical;
an aryl group;
a linkage to a polymer backbone; and
a polymer backbone; or
—$R_1R_2$— forms a heterocyclic ring.

18 Claims, No Drawings

SULFIDES OF NITROAMINO TRIPHENYL AND SUBSTITUTION OR AMINO FUNCTIONALIZED PRODUCTS THEREOF AND THE METHOD OF PREPARING THE SAME

FIELD OF THE INVENTION

The present invention relates generally to a group of compounds having nonlinear optical activity. In particular, the present invention is a compound of the following general formula:

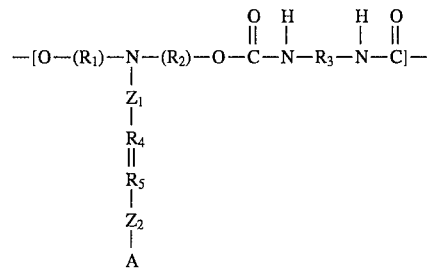

wherein the benzene nuclei may be substituted and wherein $R_1$ and $R_2$ are selected from the group consisting of:

a hydrogen atom;

an aliphatic radical;

a cycloaliphatic radical;

an arylaliphatic group;

a linkage to a polymer backbone; and a polymer backbone; or

—$R_1R_2$— forms a heterocyclic ring.

BACKGROUND OF THE INVENTION

Non-linear, optically active chromophores have second-order effect in optical switching, frequency conversion, and electrooptical modulation, to name a few applications. These compounds are also effective in third order practical applications such as optical switching, amplification, beam steering and clean-up, and image processing.

In order to be effective, most non-linear, optically active chromophores have a general chemical structure:

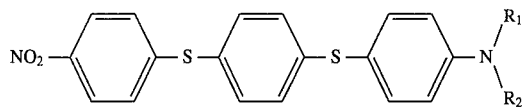

wherein A is an electron donating group, B is an electron withdrawing group, Y is a group possessing a delocalizable electron system (e.g. a benzene ring), and Z is either a divalent atom with a polarizable electron lone pair (e.g. a sulfur atom) or a π-system (e.g. a carbon-carbon double or triple bond). The polarizable electrons of the Z moiety and the delocalizable π-electrons of the Y moiety serve as a bridge facilitating communication between the A and B groups. This maintains what is known as the "push-pull" effect. Various compounds have been disclosed that exhibit these characteristics:

U.S. Pat. No. 1,965,776 to Lantz discloses sulfides of nitroaminodiphenyl or substitution products thereof which are represented by the general formula:

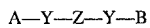

in which R and R' are benzene nuclei that may or may not be substituted.

U.S. Pat. No. 5,075,409 to Barthelemy et al. discloses polymeric materials containing non-linear, optically active chromophores having the general formula:

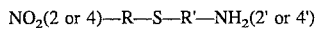

wherein $R_1$ and $R_2$ may be the same or different and denote a linear or branched methylenic chain containing preferably from 2 to 6 carbon atoms; $R_3$ is an aliphatic, aromatic, or arylaliphatic hydrocarbon radical; $R_4$ and $R_5$ may be the same or different and denote a nitrogen atom or the CH radical or are both carbon with the $R_4$—$R_5$ bond being a double or triple bond; $Z_1$ and $Z_2$ are either the same or different and denote an aromatic group, wherein $Z_1$ optionally contains one or more substituents $R_7$ and wherein $Z_2$ optionally contains one or more substituents $R_7$ in addition to group A; each substituent $R_7$ independently maybe a lower alkyl, halogen, amido, amino, sulfoxide, hydroxyl radicals, alkoxy or trifluoromethyl group; and A denotes an electron acceptor group, it being possible for $Z_2$ to carry one or more A groups, with nitro and cyano groups being the preferred electron acceptor A groups.

The above prior art summaries are merely representative of portions of the inventions disclosed in each reference. In no instance should these summaries substitute for a thorough reading of each individual reference. All of the above references are hereby incorporated by reference.

The substances disclosed in the references cited above lack the surface area necessary for greater efficiency in interacting with incoming radiation. Additionally, in cases where the chromophore is bound to a polymer carrier, it is advantageous to increase the relative amount of the non-linear, optically active moiety in order to increase the optical activity of the complete polymer matrix.

Another problem in the complete polymer matrix, often referred to as the "host-guest" system, is that these systems have the disadvantage of residual mobility of the chromophore. This residual mobility means the chromophore lacks the ability to maintain orientation and hence polarization over time, upon electric field poling. Therefore it is desirable to increase the size of the chromophore thereby increasing the bulkiness and reducing the residual mobility. From the reduction in residual mobility, the capability of the polymer matrix to maintain orientation is increased as is polarization upon electric field poling.

SUMMARY OF THE INVENTION

To avoid the disadvantages of the prior art, the present invention provides a composition of matter which may be used for a wide variety of optical applications, but which is particularly useful in non-linear, electro-optical applications.

The invention described herein is a composition of matter having the general formula:

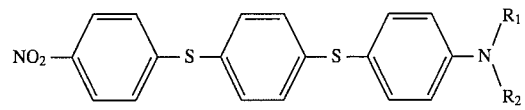

wherein the benzene rings may be substituted and wherein $R_1$ and $R_2$ are selected from the group consisting of:

a hydrogen atom; an aliphatic radical; a cycloaliphatic radical; an arylaliphatic group; an alkyl group; a linkage to a polymer backbone; and a polymer backbone; or —$R_1R_2$— forms a heterocyclic ring. The invention also includes a method of producing the above compounds.

The method of producing these compounds generally comprises the steps of providing 4-nitrophenyl disulfide and reacting this compound to 1,4-dibromobenzene in the presence of copper powder to form dinitrotriphenyl sulfide. One of the nitro groups of the dinitrotriphenyl sulfide is then reduced in the presence of phenylhydrazine and dichlorobenzene to form the product wherein $R_1$ and $R_2$ are hydrogen atoms. This amino group may then be converted into a difunctional group, for example a dihydroxy amino group, for subsequent reaction with the desired R group.

DETAILED DESCRIPTION OF THE INVENTION

Novel, optically active sulfides of nitroamino triphenyl having the formula:

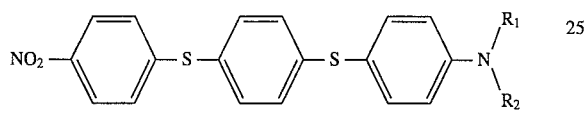

have been prepared wherein the benzene nuclei may be substituted and wherein $R_1$ and $R_2$ are selected from the group consisting of:

a hydrogen atom;

an aliphatic radical;

a cycloaliphatic radical;

an arylaliphatic group;

a linkage to a polymer backbone; and a polymer backbone; or

—$R_1R_2$— forms a heterocyclic ring. Substituents on the benzene nuclei are carefully selected so that neither the electronic nor the steric properties would disrupt the electron delocalization in the molecule. Sterically demanding substituents on the benzene ring would disrupt the coplanarity among the lone pairs and the π-electron cloud in the molecule. The planarity is a necessary prerequisite to electron delocalization. The electronic properties of the substituents must be such that they would not disrupt the electron richness of the amino substituted benzene ring nor the electron deficiency of the nitro-substituted benzene ring. This polarity creates the electron gradient that brings about delocalization.

Thus, an ideal substituent on the amino substituted benzene ring would be a small size electron donating group. Possible substituents would include —$CH_3$, —$NH_2$, —$NR_2"$, —OH, —$OCH_3$, —$OR"$, or —$R"$ wherein $R"$ is selected from the group consisting of small size alkyl groups, preferably containing 1 or 2 carbon atoms. An ideal substituent on the nitro substituted benzene ring would be a small size electron withdrawing group. Possible substituents would include —$NO_2$, —CN, —$SO_3H$, —CHO, —$COR"$, or —X, wherein $R"$ is selected from the group consisting of small size alkyl groups, preferably containing 1 or 2 carbon atoms and wherein X is a halide atom. Aliphatic radicals would include methyl, ethyl, propyl, or higher aliphatic radicals. Possible cycloaliphatic radicals include radicals which preferably do not have very high ring strain, more preferably cyclopentyl or cyclohexyl radicals. The arylaliphatic groups embraced by this invention include, but are not limited to, methyl, ethyl, and propyl radicals for the aliphatic moiety and phenyl or other aromatic rings for the aryl moiety so long as the arylaliphatic group does not introduce unfavorable steric interactions or destroy the electron donating ability of the nuclear nitrogen. The polymer backbones include copolyester, copolyether, and copolyurethane, for example. $R_1$ and $R_2$ may also form a heterocyclic ring having 4 or more carbon atoms, thereby forming a ring having 5 or more atoms.

The triphenyl sulfides of the present invention are synthesized by reactions which are expressed by the following equations:

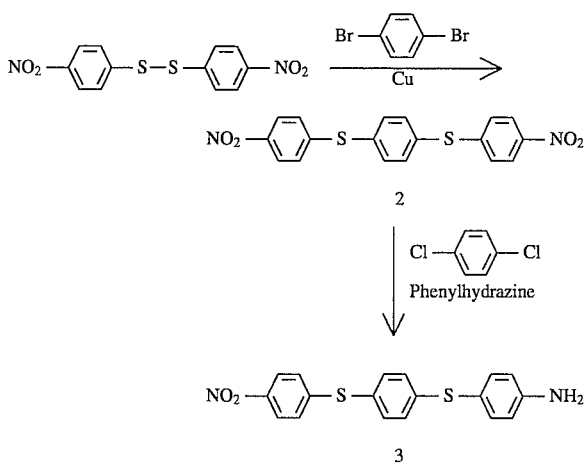

The first step is reacting 4-nitrophenyl disulfide with 1,4-dibromobenzene in the presence of copper powder to form dinitrophenyl sulfide. One of the nitro groups may then be reduced with phenylhydrazine in the presence of 1,4-dichlorobenzene. Once the product has been isolated, it may then be reacted with the appropriate R group to form the final product if necessary.

The following Examples will serve to illustrate certain specific embodiments of the herein disclosed invention. These Examples should not, however, be construed as limiting the scope of the novel invention contained herein as there are many variations which may be made thereon without departing from the spirit of the disclosed invention, as those of skill in the art will recognize.

EXAMPLES

All materials used in the Examples were purchased from standard chemical suppliers, are commercially available, or known to those skilled in the art unless otherwise stated or apparent.

Example 1

This Example illustrates the procedure for the preparation of the compounds of this invention for the simplest case, in which the benzene nuclei are not substituted and in which $R_1$ and $R_2$ are both protons.

A condensing column and a thermometer were connected to a 1000 ml, 3-necked, round-bottom flask and a magnetic stirring bar was added. 4-nitrophenyl disulfide (1)(15 g, 0.049 moles), 1,4-dibromobenzene (11.6 g, 0.049 moles), copper powder (0.49 g) (organic synthesis grade), and 250–300 ml of dimethylacetamide were added to the flask. With stirring, the mixture was heated to 135°–140° C. and maintained at this temperature for 1–2 hours. The reaction started at about 130° C. The color of the mixture changed from bronze to green and then to yellow. If excessive precipitation made it too difficult to stir the mixture, extra solvent was added. The reaction temperature was then raised to reflux (165°–170° C.). The precipitate dissolved and the color of the mixture became brown. The reaction was refluxed for 10–15 hours. Upon cooling, 300 ml of distilled water and 300 ml of benzene were added to the reaction mixture and agitated. The insoluble material was then filtered out and washed with benzene. All the benzene layers were combined and washed with water, concentrated on the rotovap, and passed through a neutral alumina column to isolate the product, dinitrotriphenyl sulfide (2). Upon eluting from the column, the benzene solution containing the product (2) was concentrated on the rotovap. Carbontetrachloride was added to precipitate the product (2)(yellow crystalline, m.p. 222° C.).

To a 100 ml, 3-necked, round-bottom flask were fitted a thermometer and a bubbler, and a magnetic stirring bar was added. Dinitrotriphenyl sulfide (0.4 g, 0.001 mole) and 1,4-dichlorobenzene (2.57 g, 0.0176 moles) were added to the flask. The mixture was heated with stirring to 110° C., at which temperature all the dinitrotriphenyl sulfide dissolved in the melted 1,4-dichlorobenzene to form a yellow solution. Phenylhydrazine (0.36 g, 0.0035 moles) was added to the solution. Evolution of nitrogen gas was observed at 110°–120° C., indicating that reduction was taking place. After a while, the nitrogen evolution was no longer observed, indicating the reaction had slowed down. The reaction was then kept at 110° C. for thirty hours. The temperature was then raised to 170° C. and maintained there for 30 minutes. After cooling, the resulting crystalline mass was dissolved in benzene and the benzene solution was passed through a neutral alumina column to isolate the product, 1-(4'-aminophenyl sulfide)-4-(4"-nitrophenyl sulfide) benzene. The product may alternatively be called 4-amino-4'-(4"-nitrophenyl sulfide) diphenyl sulfide.

The product (3) was then characterized by $^1$H NMR, the UV absorption spectrum, and CI mass spectrum. $^1$H NMR (DMSO-d6): 5.61 (s, 2H), 6.63 (d, 2H), 7.05 (d, 2H), 7.21 (q, 4H), 7.43 (d, 2H), 8.07 (d, 2H). U.V. absorption spectrum: $\lambda_{max}$=345 nm. CI Mass Spectrum: m/e (relative intensity): 355 (M+, 100), 325 (83.40), 233 (17.39), 124 (9.83), 126 (29).

As a result of the synthesis of Example 1, it is reasonable to expect that equivalent results would be obtained by the procedures set forth in the following Examples.

Example 2

The example in which both $R_1$ and $R_2$ are part of a polymer backbone, would be achieved by converting the amino group into a difunctional group, for subsequent reaction with another difunctional monomer or oligomer. This would result in a copolymer in which non-linear, optically active chromophore is covalently linked as a comonomer.

The ideal difunctional group would include, but would not be limited to, a dihydroxy moiety, which could be put on the nitrogen by replacing both protons with a halogenated alcohol. This reaction can be accomplished by reacting the product (3) with a dihydroxy compound of the formula:

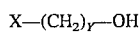

in which X is a halogen, preferably a chloride ion, and Y is an integer, preferably from 2 to 6. The most preferred diol has Y=2. The reaction is carried out in the in presence of mild base ($Na_2CO_3$ or $K_2CO_3$). The reaction has been discussed in U.S. Pat. No. 2,044,045 and by Koenig et al. in *Helv. Chim Acta*, vol. 41, p. 1184 (1958), which are incorporated herein by these references thereto. The reaction disclosed therein consists of reacting compound 3 and the halogenated alcohol, preferably ethylene chlorohydrin in a 1:2 molar ratio with stirring for 8 hours at about 100° C., in a mild aqueous alkali solution. After cooling, the product is isolated by filtration. The resulting dihydroxy compound would be represented by the following formula (4):

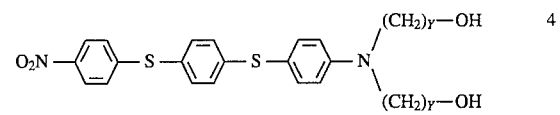

The dihydroxy compound (4) would be reacted with other difunctional monomers or oligomers to form a copolymer in which the chromophore would be a comonomer. The ideal difunctional monomers or oligomers would include, but would not be limited to, diacyl chlorides (to form a copolyester), diisocyanate (to form a copolyurethane) or a dihalogenated compound (to form a copolyether). Examples of the resulting copolymers are represented as formulas (5) (copolyurethane), (6) (copolyester), and (7) (copolyether).

Copolymerization of the difunctional chromophore and the difunctional monomer or oligomer would be effected by low temperature solution polymerization (a condensation reaction) as is known in the art. For example, to a stirred solution of the difunctional oligomer or monomer in a polar solvent, contained within a reaction flask protected from moisture, the difunctional chromophore is added dropwise. The reaction mixture is kept at 150° C. by means of a water bath.

After one hour of reaction, the viscous reaction mixture is diluted by addition of a small amount of the polar solvent. The reaction mixture is poured into a beaker of water with stirring, whereby the polymer precipitates. The polymer is then filtered out and air dried.

The possible resulting copolymers are not limited to 5, 6 and 7 (below). Any difunctional monomer or oligomer whose functional groups are capable of undergoing a condensation reaction with the hydroxy groups of the chromophore will be able to form a copolymer with the difunctional chromophore.

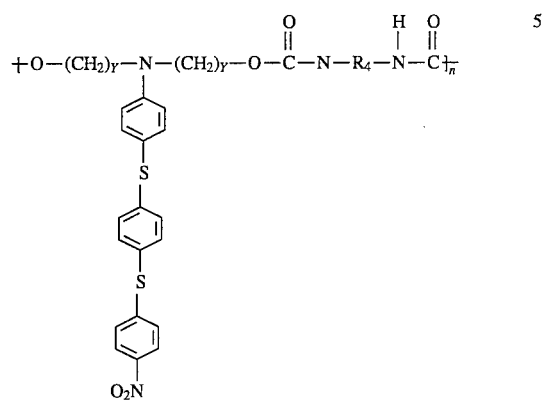

-continued $$+O-(CH_2)_Y-N-(CH_2)_Y-O-\overset{O}{\overset{\|}{C}}-R_4-\overset{O}{\overset{\|}{C}}+_n \quad 6$$

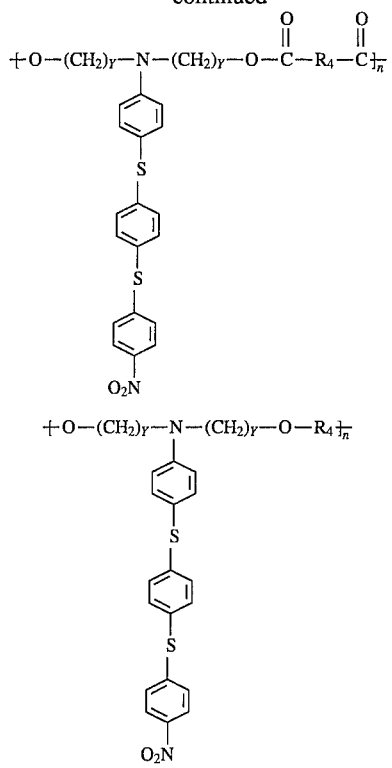

$$+O-(CH_2)_Y-N-(CH_2)_Y-O-R_4+_n \quad 7$$

wherein $R_4$ may be any combination of phenyl and small size (2 or 3 carbon atoms) linear alkyl groups when the difunctional group is a monomer; and wherein $R_4$ is the main segment of the oligomer, when the difunctional group is an oligomer; Y is an integer preferrably between 2 and 6; and n is an integer of at least twenty, so that the resulting molecular weight would be in the macromolecular regime.

Example 3

The case in which either $R_1$ or $R_2$ or both are aliphatic radicals could be effected by replacing either or both protons on the amino group with the desired alkyl group. The reaction conditions described in Example 2, above, would be used and the alkyl group would be introduced as the alkyl chloride. The most common alkyl halides would be primary alkyl halides possessing one or two carbons, however, longer chain aliphatic radicals could also be used. The following formula (8) represents the case in which both amine protons have been replaced by ethyl groups, which were introduced as ethyl chloride:

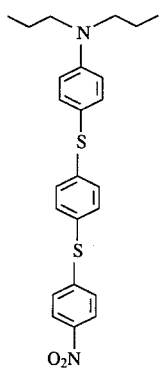

8

Example 4

The case in which either $R_1$ or $R_2$ or both are cycloaliphatic radicals could be effected by replacing either or both protons on the amino group with the desired cycloaliphatic group. The reaction conditions described in Example 2, above, would be used and the cycloaliphatic group would be introduced as the cycloaliphatic chloride. To minimize ring strain, the ideal ring would be a cyclopentyl or cyclohexyl ring. The following formula (9) represents the case in which both amine protons have been replaced by cycloaliphatic groups, which were introduced as the chlorides:

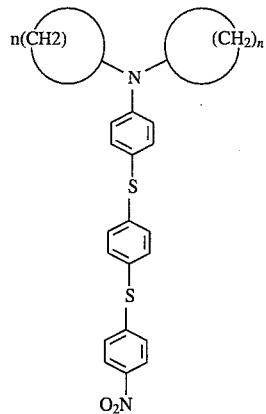

wherein n is most preferably either 5 or 6.

Example 5

The case in which either $R_1$ or $R_2$ or both are arylaliphatic radicals could be effected by replacing either or both protons on the amino group with the desired arylaliphatic group. The reaction conditions described in Example 2, above, would be used and the arylaliphatic group would be introduced as an arylaliphatic chloride. The aromatic part would be selected from the group consisting of phenyl, biphenyl or naphthyl. The ideal aralkyl group would be one in which there are at least two carbons between the nitrogen and the aryl group. An example would be a phenylethyl group, in which the benzene ring is connected by two carbons to the nitrogen, however other compounds are possible. This arrangement will eliminate the presence of any carbon that could be rehybridized to $sp^2$, adjacent to the nitrogen atom. Eliminating the possibility of rehybridization brings about the desirable situation whereby the mesomeric interaction of the nitrogen lone pair is restricted to only the sulfur bonded benzene ring. Other possibilities include those arylaliphatic groups in which the aromatic rings do not introduce unfavorable steric hinderance or destroy the electron donating ability of the nuclear nitrogen would be equally suitable. The following formula (10) represents the case in which both amine protons have been replaced by arylaliphatic groups, which were introduced as the chlorides:

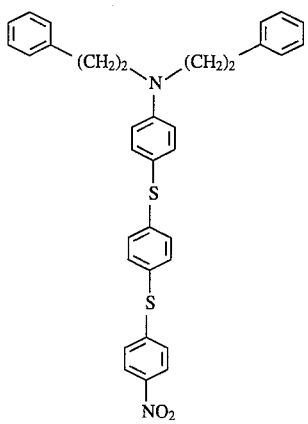

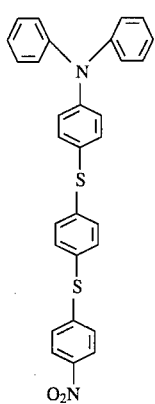

Example 7

This example illustrates the case in which both $R_1$ and $R_2$ are part of a heterocyclic hydrocarbon ring with the nitrogen to which they are attached. This could be effected by replacing both protons on the amino group with the desired hydrocarbon group. The reaction conditions described in Example 2, above, would be used and the hydrocarbon group would be introduced as the dichloride. The ideal ring size would be a five membered ring made from a linear dihaloalkyl compound possessing three carbons. The following formula (12) represents the case in which both amine protons have been replaced to form a heterocyclic ring with the nitrogen.

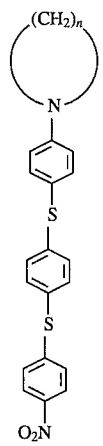

The foregoing Examples have been prepared for the purposes of illustration and description. They are not intended to be exhaustive or to limit the invention to the practice forms disclosed, and obviously many modifications and variations are possible in light of the above technology. Such modifications and variations that may be apparent to one skilled in the art are intended to be included within the scope of the invention as defined by the accompanying claims.

I claim:

1. A composition of matter having the structural formula:

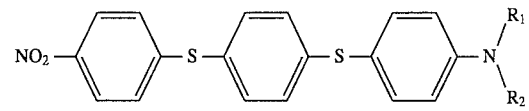

wherein the nitro substituted benzene nucleus may be additionally substituted, wherein the additional substituents are small size electron withdrawing groups;

wherein the amino substituted benzene nucleus may be additionally substituted, wherein the additional substituents are small size electron donating groups; and wherein $R_1$ and $R_2$ are selected from the group consisting of: a hydrogen atom; an aliphatic radical; a cycloaliphatic radical; an arylaliphatic group having an aliphatic moiety at least two carbons long; a linkage to a polymer backbone; and a copolymer backbone, said copolymer backbone selected from the group consisting of: copolyester, copolyether, and copolyurethane; or —$R_1R_2$— forms a heterocyclic hydrocarbon ring.

2. A composition of matter according to claim 1 wherein $R_1$ and $R_2$ are selected from the group consisting of: a hydrogen atom; an aliphatic radical having from 1 to 2 carbon atoms; a cycloaliphatic radical having from 5 to 6 carbon atoms; an arylaliphatic radical wherein the aliphatic moiety is selected from the group consisting of: methyl; ethyl; and propyl and wherein the aryl moiety is a phenyl group; an aromatic radical selected from the group consisting of a phenyl ring; and a polymer backbone selected from the group consisting of: polyester; polyurethane; and polyether; or —$R_1R_2$— forms a heterocyclic ring having 2 or 4 carbon atoms.

3. A composition of matter according to claim 1 wherein $R_1$ and $R_2$ are aliphatic radicals.

4. A composition of matter according to claim 1 wherein $R_1$ and $R_2$ are cycloaliphatic radicals.

5. A composition of matter according to claim 1 wherein $R_1$ and $R_2$ are arylaliphatic groups, wherein the aliphatic moiety is at least two carbons long.

6. A composition of matter according to claim 1 wherein $R_1$ and $R_2$ are each a polymer backbone, said copolymer backbone selected from the group consisting of: copolyester, copolyether, and copolyurethane.

7. A composition of matter according to claim 1 wherein —$R_1R_2$— forms a heterocyclic hydrocarbon ring.

8. A method of synthesizing a composition of matter having the structural formula:

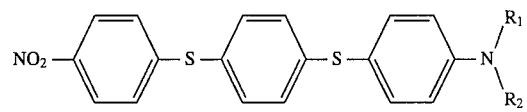

wherein the nitro substituted benzene nucleus may be additionally substituted, wherein the additional substituents are small size electron withdrawing groups;

wherein the amino substituted benzene nucleus may be additionally substituted, wherein the additional substituents are wherein $R_1$ and $R_2$ are selected from the group consisting of: a hydrogen atom; an aliphatic radical; a cycloaliphatic radical; an arylaliphatic group having an aliphatic moiety at least two carbons long; a linkage to a polymer backbone; and a copolymer backbone, said copolymer backbone selected from the group consisting of: copolyester, copolyether, and copolyurethane; or —$R_1R_2$— forms a heterocyclic hydrocarbon ring, comprising the steps of:

providing a vessel;

adding 4-nitrophenyl disulfide, 1,4-dibromobenzene, copper powder, and dimethylacetamide to said vessel;

subjecting said vessel to 135°–140° C. (±15° C.) for approximately 1–2 hours and refluxing at 165°–170° C. (±15° C.) for approximately 10–15 hours to allow said 4-nitrophenyl disulfide and said 1,4-dibromobenzene to react, thereby forming dinitrotriphenyl sulfide;

reducing said dinitrotriphenyl sulfide with phenylhydrazine, thereby forming 1-(4'-aminophenyl sulfide)-4-(4"-nitrophenyl sulfide) benzene;

reacting said 1-(4'-aminophenyl sulfide)-4-(4"-nitrophenyl sulfide) benzene with a halogenated alcohol in a 1:2 molar ratio with stirring at about 100° C. for approximately 8 hours in a mild aqueous alkali solution to form a dihydroxy compound in a reaction mixture;

allowing said reaction mixture to cool; and filtering out the dihydroxy compound from the reaction mixture.

9. The method of claim 8 further comprising the steps of:

reacting the dihydroxy compound with a difunctional molecule in a low temperature solution polymerization reaction in which the dihydroxy compound is added dropwise to a stirred solution of the difunctional molecule in a polar solvent to form a second reaction mixture;

maintaining the second reaction mixture at approximately 150° C. by means of a water bath for one hour;

diluting the second reaction mixture with a polar solvent, thereby forming a diluted reaction mixture;

pouring the diluted reaction mixture into a beaker of water while stirring, thereby creating a precipitate;

filtering out and air drying the precipitate to obtain a copolymer.

10. A non-linear optically active preparation comprising an effective amount of a composition of matter having the structural formula:

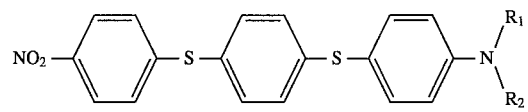

wherein the nitro substituted benzene nucleus may be additionally substituted, wherein the additional substituents are small size electron withdrawing groups;

wherein the amino substituted benzenenucleus may be additionally substituted, wherein the additional substituents are small size electron donating groups; and wherein $R_1$ and $R_2$ are selected from the group consisting of: a hydrogen atom; an aliphatic radical; a cycloaliphatic radical; an arylaliphatic group having an aliphatic moiety at least two carbons long; a linkage to a polymer backbone; and a copolymer backbone, said copolymer backbone selected from the group consisting of: copolyester, copolyether, and copolyurethane; or —$R_1R_2$— forms a heterocyclic hydrocarbon ring.

11. A non-linear, optically active preparation according to claim 10 wherein $R_1$ and $R_2$ are selected from the group consisting of: a hydrogen atom; an aliphatic radical having from 1 to 2 carbon atoms; a cycloaliphatic radical having from 5 to 6 carbon atoms; an arylaliphatic radical wherein the aliphatic moiety is selected from the group consisting of: methyl; ethyl; and propyl and wherein the aryl moiety is a phenyl group; an aromatic radical selected from the group consisting of a phenyl ring; and a polymer backbone selected from the group consisting of: polyester; polyurethane; and polyether; or —$R_1R_2$— forms a heterocyclic ring having 2 or 4 carbon atoms.

12. A non-linear, optically active preparation according to claim 10 wherein $R_1$ and $R_2$ are aliphatic radicals.

13. A non-linear, optically active preparation according to claim 10 wherein $R_1$ and $R_2$ are cycloaliphatic radicals.

14. A non-linear, optically active preparation according to claim 10 wherein $R_1$ and $R_2$ are arylaliphatic groups.

15. A non-linear, optically active preparation according to claim 10 wherein $R_1$ and $R_2$ are each an aryl group.

16. A non-linear, optically active preparation according to claim 10 wherein $R_1$ and $R_2$ are each a polymer backbone.

17. A non-linear, optically active preparation according to claim 16 wherein each of said polymer backbones are selected from the group consisting of: polyurethane; polyether; and polyester.

18. A non-linear, opticallly active preparation according to claim 10 wherein —$R_1R_2$— forms a heterocyclic hydrocarbon ring.

* * * * *